United States Patent [19]

Guidoux

[11] 4,355,406

[45] Oct. 19, 1982

[54] CARRIER DETECTOR IN A MODEM PROVIDED WITH AN ECHO CANCELER

[75] Inventor: Loïc B. Y. Guidoux, Massy, France

[73] Assignee: U.S. Philips Corporation, New York, N.Y.

[21] Appl. No.: 203,161

[22] Filed: Nov. 3, 1980

[30] Foreign Application Priority Data

Nov. 7, 1979 [FR] France .................................. 79 27479

[51] Int. Cl.³ .............................................. H04B 3/20
[52] U.S. Cl. .................................. 375/82; 179/170.6; 179/170.2; 455/50
[58] Field of Search ...................... 375/7, 8, 76, 82, 94; 455/49, 50, 58, 78; 370/24, 29, 32; 179/170.2, 170.4, 170.6, 170.8

[56] References Cited

U.S. PATENT DOCUMENTS

| | | | |
|---|---|---|---|
| 3,231,687 | 1/1966 | Riesz | 179/170.6 |
| 3,275,759 | 9/1966 | Brady | 179/170.6 |
| 3,560,669 | 2/1971 | Foulkes | 179/170.6 |

*Primary Examiner*—Michael A. Masinick
*Assistant Examiner*—Stephen Chin
*Attorney, Agent, or Firm*—Thomas A. Briody; William J. Streeter; Edward W. Goodman

[57] ABSTRACT

A carrier detector in a modem provided with an echo canceler comprises a first detection circuit which processes the level of the echo canceler output signal. In addition, the detector comprises a second detection circuit which processes the level of the output signal of an amplitude regulator connected to the output of the echo canceler. This second detection circuit produces an indication of the carrier interruption in the range of the high carrier levels, in which the first circuit is not operative for detecting a carrier interruption.

2 Claims, 7 Drawing Figures

CARRIER DETECTOR IN A MODEM PROVIDED WITH AN ECHO CANCELER

BACKGROUND OF THE INVENTION

The invention relates to a carrier detector in a modem provided with an echo canceler, the carrier detector comprising a first detection circuit which processes a signal representative of the level of the output signal of the echo canceler.

Generally, this carrier detector is included in the receiver of a modem utilizing modulation of a carrier for the data transmission. During certain procedures this detector is used, for example, to indicate whether the modem at the other end of the line transmits or does not transmit a carrier so that the data reproduced by the receiver are only validated when a carrier is transmitted.

A known carrier detection circuit consists solely of a threshold circuit which processes a signal representative of the level of the received carrier to indicate whether this received carrier is present or not.

However, a special carrier detection problem is encountered in a modem which is provided with an adaptive echo canceler for automatically canceling the echo signals which may reach the receiver. An echo canceler for data transmission is disclosed in, for example, applicant's French Patent Application No. 2,377,734. By means of modems comprising an echo canceler, data can be simultaneously transmitted in both directions over one single transmission line. It is clear that in a modem comprising an echo canceler the carrier detector must be arranged behind the output of the echo canceler in order to detect only the carrier coming from the other end of the line, for, during simultaneous transmission in both directions, there remains in practice at the output of the echo canceler a residual echo signal whose level $E_r$ is coupled to the level S of the carrier received from the other end in accordance with the formula:

$$\frac{E_r}{S} = \sqrt{\frac{\alpha N}{2 - \alpha N}}$$

In this formula, which is derived in an article by Mueller in IEEE Transactions, vol. COM-24, no 9, September 1976, pages 956-962, N is the number of filter coefficients of the echo canceler and $\alpha$ is a constant coefficient small with respect to 1, which coefficient determines the magnitude of the increment by which these filter coefficients are modifed.

In practice $\alpha N$ is small with respect to 2 and the above-mentioned formula may be replaced by the approximation;

$$\frac{E_r}{S} = \sqrt{\frac{\alpha N}{2}}$$

In order to reduce the ratio $E_r/S$, the coefficient $\alpha$ can be reduced but this possibility is limited by the resultant increase in the convergence time of the echo canceler. In practice a coefficient $\alpha$ is chosen resulting on the one hand in a reasonable convergence time and on the other hand in such a ratio $E_r/S$ that the receiver can easily distinguish the data transmitted by the carrier having the level S in the presence of the residual echo signal having the level $E_r$. Finally, for a given modem the residual echo signal has a level $E_r$ which has a given deviation of $-K$ dB, for example $-20$ dB, with respect to the level S of the carrier.

As regards the considered carrier detector, it should be noted that after an interruption of the carrier the signal at the output of the echo canceler is not immediately canceled because of the convergence time of the echo canceler. A time interval of several seconds may elapse before this cancelation is achieved. The signal produced at the output of the echo canceler after the interruption of the carrier has at first the level $E_r$ of the residual echo signal which deviates by $-K$ dB with respect to the level S of the carrier before the interruption.

On the other hand, the transmission medium of the facility connecting the two modems has an attenuation which is not known, particularly when the connection is effected through the switched public telephone network; this attenuation may vary between 0 dB and a maximum value of A dB, for example equal to 48 dB. From this it follows that, relative to the level of the transmitted carrier taken as a reference, the level S of the received carrier varies in the range between 0 dB and $-A$ dB. Relative to the same reference level, the level $E_r$ of the residual echo signal after interruption of the carrier varies in the range between $-K$ dB and $-(A+K)$ dB. It is clear that the level of the residual echo signal after an interruption of a high level carrier may be higher than the level of a low level carrier and that the prior art detection circuit processing a signal representative of the level of the output signal of the echo canceler runs the risk of not detecting a carrier interruption.

In order to achieve, that the known detection circuit detects a carrier interruption, the level $E_r$ of the residual echo signal which has a value $(S-K)$dB must evidently be lower than the lowest carrier level, that is $-A$ dB. This condition may be written as $$S < (-A + K) \text{ dB}.$$

In other words, the known carrier detection circuit can only detect a carrier interruption in the range of the low carrier levels located between the minimum level $-A$ dB and the level $(-A+K)$ dB, for example, between $-48$ dB and $-28$ dB in the example where $A = 48$ dB and $-K = -20$ dB. In the range of higher carrier levels up to the maximum level of 0 dB, the known carrier detection circuit cannot detect the carrier interruption.

SUMMARY OF THE INVENTION

The present invention has for its object to provide a carrier detector functioning in the complete range of the levels of the received carrier and associating a second detection circuit for the higher carrier levels with the known circuit.

According to the invention, the carrier detector comprising a first detection circuit which processes a signal representative of the level of the output signal of the echo canceler, is characterized in that the carrier detector further comprises a second detection circuit which processes a second signal representative of the level of the output signal of an amplitude regulator connected to the output of the echo canceler, this second detection circuit including a bistable circuit having hysteresis and having two thresholds located on both sides of the operating value of the said second level signal with predetermined deviations with respect to this operating value, this bistable circuit changing to a first state corresponding to the indication of a carrier interruption when the second level signal decreases to below the low threshold, and changing changes to a second state when the second level signal increases to above the high threshold or when the first detection circuit furnishes the indication of a carrier interruption, the indication of a carrier interruption at the output of the carrier detector being produced by the first or the second detection circuit.

In certain circumstances, and after a short and untimely interruption of the carrier, the detector may remain in the blocked condition indicating an interruption of the carrier.

To prevent blocking of the detector, it is advantageous to provide the detector embodying the invention with means for limiting the period of time in which the bistable circuit is in its first state to a predetermined value.

DESCRIPTION OF THE DRAWINGS

The invention will now be further explained by way of non-limitative example with reference to the accompanying drawings, in which.

DESCRIPTION OF THE PREFERRED EMBODIMENT

Figure 1:
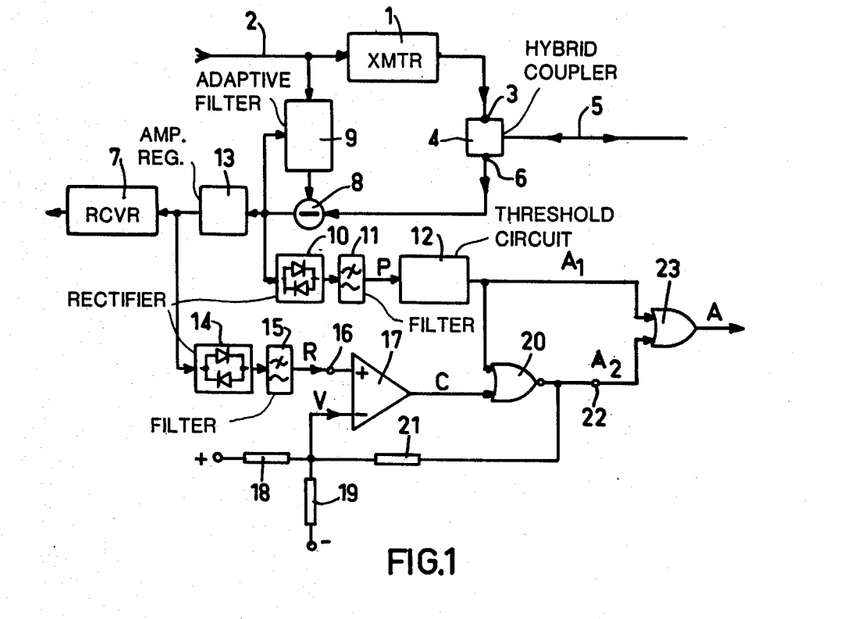
FIG. 1 shows a circuit diagram of the carrier detector according to the invention.

FIG. 1 is a circuit diagram of the carrier detector according to the invention associated with a modem for data transmission by means of modulation of a carrier, the modem being provided with an echo canceler.

This modem comprises a transmitter 1 receiving the data to be transmitted from a line 2 and applying a carrier modulated by the data to a transmit port 3 of a hybrid coupler 4. The two-wire input of this hybrid coupler 4 is connected to a transmission line 5. The modulated carrier originating from another modem, not shown in FIG. 1, at the other end of the transmission line 5 appears at a receive port 6 of the hybrid coupler 4 and must be applied to a receiver 7 of the modem.

In order to prevent the appearance at the input of the receiver 7 of unwanted echo signals resulting from imperfections of the hybrid coupler 4 and/or discontinuities in the transmission line 5, the modem is provided with an automatic echo canceler which comprises a difference circuit 8, which receives the signal from the receive port 6 of the hybrid coupler 4 and also an echo copy signal produced by an adaptive filter 9. In the example shown, this adaptive filter 9 receives the data signal applied to the transmitter 1 and the coefficients of this filter 9 are controlled by the output signal of the difference circuit 8. An echo canceler of this type is disclosed in the above-mentioned French Patent application No. 2,377,734.

The described carrier detector must detect whether the modem receives or does not receive the carrier coming from the other end of the transmission line 5.

A known carrier detector comprises a circuit which forms a level signal P and which is connected in the relevant modem to the output of the difference circuit 8 to avoid theoretically any unwanted influence of the echo signal. This circuit for forming the level signal P is constituted by a full-wave rectifier 10, followed by a low-pass filter 11. A threshold circuit 12 is connected to the output of the filter 11 which circuit 12 can indicate whether the received carrier is present or not by comparing the level signal P with a threshold.

As has already been explained in the foregoing, this simple detection circuit for the signal level at the output of the echo canceler does not, however, operate in the complete range of possible levels of the received carrier. In the following description, use is made of the above-mentioned example in which the attenuation of the transmission line 5 may vary between 0 dB and A=48 dB so that the level S of the received carrier may vary between 0 dB and −48 dB with respect to the level of the transmitted carrier serving as a reference. On the other hand, it is also assumed that the level $E_r$ of the residual echo signal is $-K=-20$ dB relative to the level S.

Figure 2:
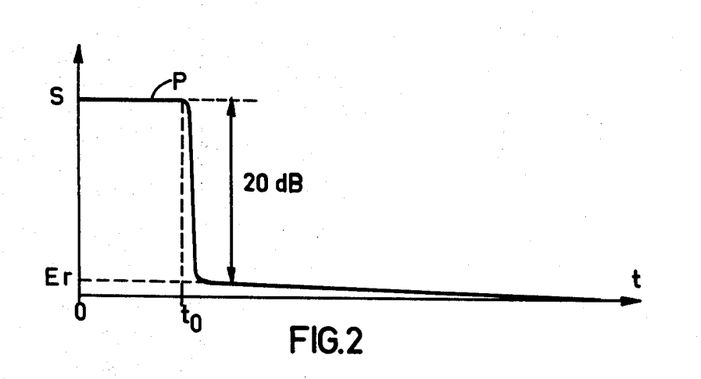
FIG. 2 is a time diagram showing the level of the signal at the output of the echo canceler before and after an interruption of the carrier.

The diagram of FIG. 2 shows the signal P applied to the threshold circuit 12 prior to and after the instant $t_o$ of the interruption of the carrier at the other end of the transmission line 5. Prior to the instant $t_o$ the signal P has the value of the level S of the received carrier, the residual echo signal superimposed on this received carrier being neglected. After the instant $t_o$ the signal P rapidly assumes the value of the level $E_r$ of the residual echo signal, that is to say a value of 20 dB below the level S. Thereafter the signal P decreases progressively until it has become zero after a period of time depending on the convergence time of the echo canceler. The maximum period of time in which the signal T decreases to zero after the instant $t_o$ is, for example, $\tau=5$ seconds.

When the threshold of the circuit 12 detecting the interruption of the carrier has been adjusted to the minimum received carrier level of −48 dB, the signal P shortly after the instant $t_o$ of the carrier interruption does only drop below this threshold for low levels of the received carrier, located between −48 dB and −28 dB, and it remains above this threshold for levels of the received carrier higher than −28 dB. In other words, the known carrier detector 10, 11, 12 does no longer operate correctly in the range of the higher levels of the received carrier, located between −28 dB and 0 dB.

To mitigate this drawback, the carrier detector according to the invention uses a second carrier detection circuit associated with the known circuit. In accordance with the invention, this second carrier detection circuit processes a signal derived from the output signal of an amplitude regulator 13 connected to the output of the difference circuit 8 of the echo canceler. An amplitude regulator, a circuit well-known to a person having normal skill in the art, consists in essence of an amplifier having an automatic gain control loop (AGC) for producing an output signal of a constant amplitude. It should be noted that it has already been known to incorporate an amplitude regulator in modems utilizing phase or frequency modulation in order to have the receiver operate with a carrier of constant amplitude. A full-wave rectifier 14 is connected to the output of the amplitude regulator 13 which rectifier 14 is followed by a low-pass filter 15 for producing a signal R which is representative of the level of the amplitude regulator output signal. So the signal R has a constant operating value $R_o$ beyond the transition periods.

The signal R is applied to an input 16 of a bistable circuit having hysteresis and having a low threshold B and a high threshold H located on both sides of the operating value $R_o$ of the signal R with given deviations with respect to this operating value $R_o$. This bistable circuit is formed by a comparator 17 whose noninverting input receives the signal R at input 16 and whose inverting input receives a threshold signal V which may assume the low threshold value B or the high threshold value H. This threshold signal V is derived from the common junction of two resistors 18 and 19 connected in series to the positive and negative terminal of a supply source. This common junction of resistors 18 and 19 is also connected to the output of a NOR-gate 20 by means of a resistor 21. One input of this NOR-gate 20 is connected to the output of the comparator 17 and its other input is connected to the output of the threshold circuit 12 forming the output of the known detection circuit. The output of the NOR-gate 20 forms an output 22 of the bistable circuit having hysteresis. The low threshold and the high threshold of this bistable circuit are adjusted by means of the resistors 18, 19 and 21.

The operation of this bistable circuit is easy to describe. It is assumed that the logic signal "0" corresponds to a low voltage level and that the logic signal "1" corresponds to a high voltage level. It is further assumed that a logic signal "0" at the output of the first detection circuit (the output of the circuit 12) or at the output of the second detection circuit (output 22 of the bistable circuit) is an indication that the carrier is present, while a logic signal "1" is an indication that the carrier is absent.

First the case will be considered in which the logic signal $A_1$ at the output of the circuit 12 has the value "0". When the logic signal C at the output of the comparator 17 has the value "1", the logic signal $A_2$ at the output 22 of the bistable circuit has the value "0" and the threshold signal V has the value of the low threshold B, the signal R being greater than this low threshold. When the signal R decreases and drops below this low threshold, the signal $A_2$ at the output 22 of the bistable circuit assumes the value "1" and the threshold signal V assumes the value of the high threshold H. When, thereafter, the signal R increases to above this high threshold, the signal $A_2$ assumes the value "0" and the low threshold B is restored again. In contrast therewith, in the case in which signal $A_1$ at the output of the circuit 12 has the value "1", the signal $A_2$ at the output 22 of the bistable circuit has the value "0" and is not affected by the signal R.

On the basis of the above-mentioned assumptions the output signal A of the carrier detector according to the invention is obtained at the output of an OR-gate 23 which receives the signal $A_1$ from the first detection circuit at one input and the signal $A_2$ from the second detection circuit at its other input.

The operation of the detector according to the invention will be explained for different circumstances with reference to the diagrams shown in FIG. 3, FIG. 4 and FIG. 5, which show several signals as a function of the time.

Figure 3:
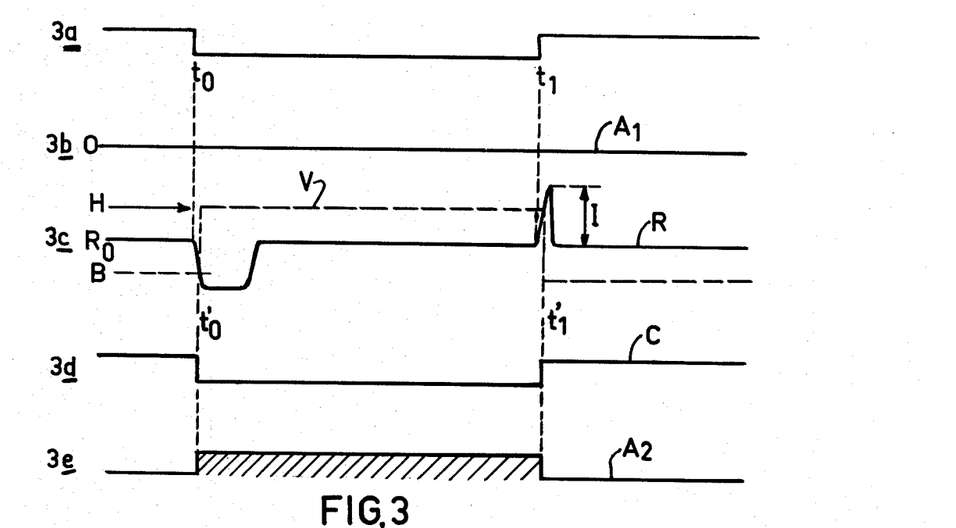
FIGS. 3, 4 and 5 show a number of time diagrams illustrating the operation of the detector of FIG. 1 in various circumstances.

FIG. 3 corresponds to the case in which the received carrier has a high level. As indicated schematically by diagram 3a, the transmitted carrier is interrupted in the time interval from $t_o$ to $t_1$ and is present for the rest of the time. It is assumed that during this time interval [$t_o$, $t_1$] the first detection circuit 10, 11, 12 does not detect the interruption of the carrier so that the logic signal $A_1$ at the output of the circuit 12 keeps the value "0" (see diagram 3b).

The diagram 3c shows the signal R which is representative of the level of the signal at the output of the amplitude regulator 13. Outside the transition intervals subsequent to the instants $t_o$ and $t_1$ of the interruption and restoration of the carrier, this signal R has an operating value $R_o$. After the instant $t_o$ of the carrier interruption the signal R first drops 20 dB below $R_o$ in order to assume the level of the residual echo signal, as the amplitude regulator 13 has of necessity a certain time constant which is greater than the time constant of the lowpass filter 15 supplying the signal R. During a short period of time the signal R keeps substantially the value $(R_o-20)$ dB and thereafter, when the amplitude regulator 13 has responded to the decrease of the signal at its input, the signal R regains its operating value $R_o$. It is important to note that, irrespective of the level of the received carrier, a decrease by 20 dB of the signal R is always observed at the interruption of the carrier.

Diagram 3c shows that, after the instant $t_1$ at which the carrier is restored, the signal R presents a short transitional pulse above the operating value $R_o$. This pulse is also caused by the time constant of the amplitude regulator 13, but, taking into consideration that the residual echo signal is cancelled at the instant $t_1$, the amplitude I of this pulse is substantially equal to the level of the restored carrier. So this amplitude I varies like the level of the carrier and in the case shown in FIG. 3 this amplitude is comparatively large, as is the carrier level.

Prior to the instant $t_o$ of the carrier interruption the output signal C of the comparator 17 has the value "1", as shown in diagram 3d. As a result, the signal $A_2$ at the output 22 of the bistable circuit has the value "0", as shown in diagram 3e. The threshold signal V represented by the dotted curve in diagram 3c shows that the low threshold B is simultaneously set at the inverting input of the comparator 17.

After the instant $t_o$ of the carrier interruption the signal R drops by 20 dB and decreases to below the low threshold B. At the instant $t_o'$ at which this threshold is exceeded, this instant being very close to $t_o$, the signal C changes to the value "0" and the signal $A_2$ changes to the value "1", which indicates a detection of the carrier interruption at the output 22 of the second detection circuit, this interruption not having been detected by the first detection circuit. As shown by curve V in diagram 3c, the high threshold H is simultaneously set at the inverting input of the comparator 17. As shown by diagram 3c, the signal R exceeds the high threshold H during the pulse having amplitude I which is produced just after the instant $t_1$ at which the carrier is restored. At the instant $t_1'$ at which this threshold is exceeded, this instant being very close to $t_1$, the signal C changes to the value "1" and the signal $A_2$ changes to the value "0", which indicates a detection of the restoration of the carrier. Simultaneously the low threshold B is set again at the inverting input of the comparator 17.

The time interval during which the complete detector indicates an interruption of the carrier is the interval during which the output signal A of the OR-gate 23 has the value "1". This interval which is represented by the hatched zone of diagram 3e coincides with the interval in which the signal $A_2$ of the bistable circuit has the value "1".

Figure 4:
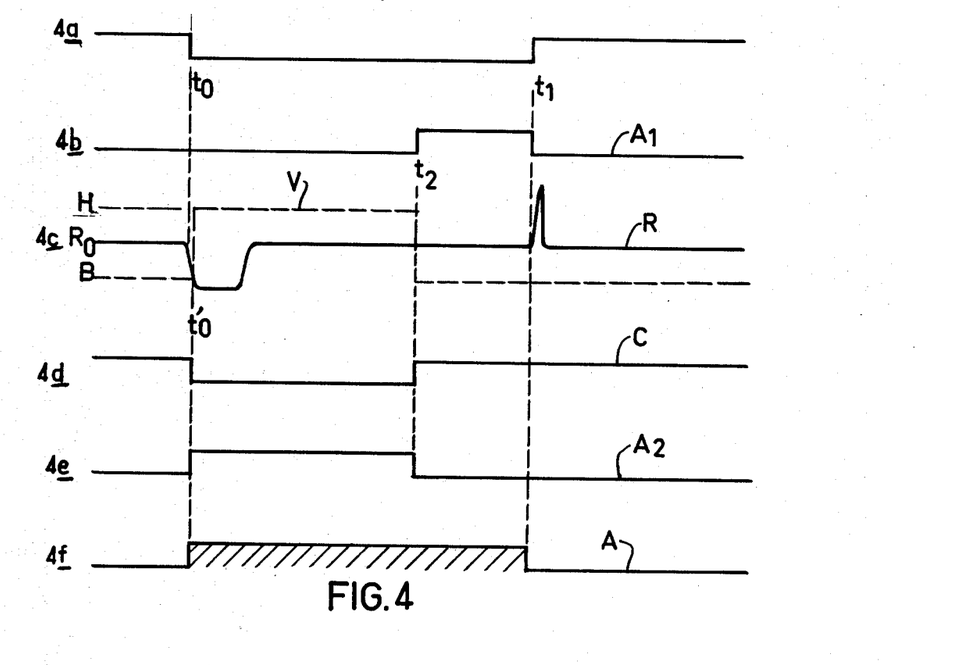

The case illustrated in FIG. 4 differs from the case shown in FIG. 3 in that the first detection circuit detects this interruption during the time interval [$t_o$, $t_1$] of the carrier interruption, but that it does so with a certain delay. The diagrams 4a–4e show the same signals as the diagrams 3a–3e. Until the instant $t_2$, at which the signal $A_1$ assumes the value "1" (indicating that the first detection circuit detects a carrier interruption), the signals $A_1$, V, R, C, $A_2$ in FIG. 4 are identical to those in FIG. 3. At the instant $t_2$, when the signal $A_1$ assumes the value "1", the signal $A_2$ changes to the value "0" almost immediately resulting in the setting of the low threshold B at the inverting input of the comparator 17 and the change of signal C to the value "1". At the instant $t_1$ at which the carrier has been restored, this restoration is detected by the first detection circuit whose output signal $A_1$ changes to the value "0". In the case considered in FIG. 4, the pulse of the signal R following the instant $t_1$ is not used for the detection of the restoration of the carrier. The time interval during which the complete detector indicates an interruption of the carrier is shown by the hatched zone in diagram 4f. In this interval either the output signal $A_1$ of the first detection circuit or the output signal $A_2$ of the second detection circuit has the value "1".

Figure 5:
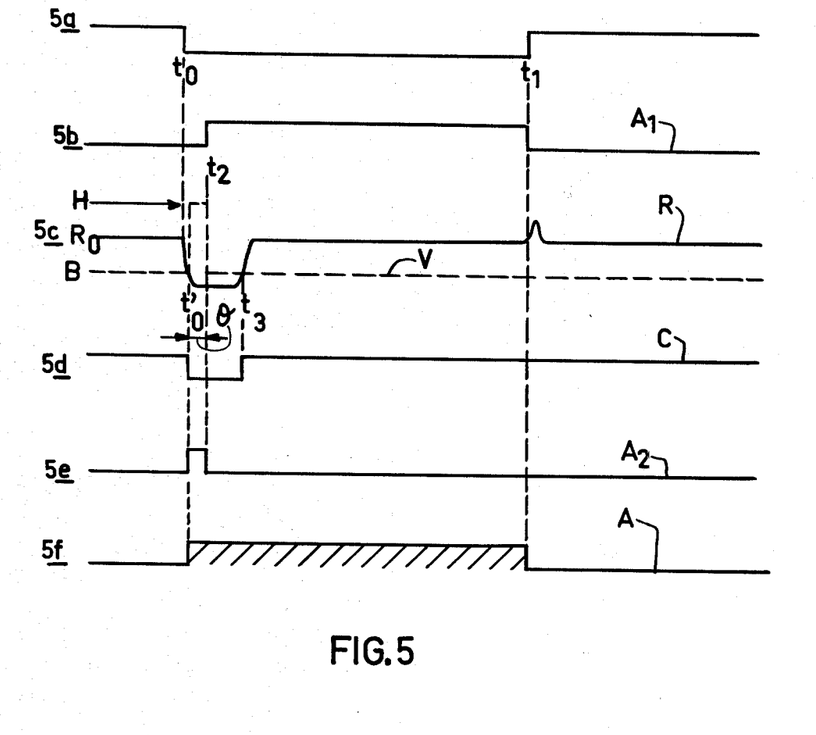

The case illustrated in FIG. 5 differs from the cases shown in FIG. 3 and FIG. 4 in that the received carrier has now a low level which is, for example, near the minimum level of −48 dB. In that case the first detection circuit can correctly detect the interruption and the restoration of the carrier, while the second detection circuit can only detect the interruption of the carrier. It is, for example, assumed that the detection of the interruption by the first detection circuit occurs with a slight delay $\theta$ with respect to the detection of the interruption by the second detection circuit. As shown by diagram 5c, in the case considered here the signal R always presents a transitional decrease of 20 dB after the interruption instant $t_o$, but the pulse occurring after the restoration instant $t_1$ has, on the contrary, almost disappeared and its amplitude I is well below the high threshold H. At the instant $t_o'$ at which the decreasing signal exceeds the low threshold B, the signal C changes to the value "0" and the signal $A_2$ changes to the value "1", while the threshold signal V changes to the high threshold H. At the instant $t_2=t_o'+\theta$ at which the signal $A_1$ changes to the value "1", the signal $A_2$ changes back to the value "0", while the threshold signal V again assumes the low threshold B. At the instant $t_3$ the increasing signal R exceeds this low threshold, in response to which the signal C changes back to the value "1". Restoration of the carrier at the instant $t_1$ is indicated by the change of the signal $A_1$ to the value "0". The hatched zone in diagram 5f represents the time interval in which the complete detector indicates the carrier interruption.

In the above-described example it appears that the first detection circuit producing the signal $A_1$ can properly detect both the interruption and the restoration of the carrier in the range of the low carrier levels from −48 dB to −28 dB. The second detection circuit producing the signal $A_2$ must take over the function of the first circuit for the range of the high carrier signal levels up to 0 dB. It will be clear that measures must be taken to ensure a wide overlap of the operating ranges of the two detection circuits. Detecting the carrier interruption is no problem whatsoever for this overlap, as the second detection circuit is capable of always indicating this interruption, irrespective of the level of the carrier. To guarantee this overlap as regards detection of the restoration of the carrier, it is sufficient to adjust the high threshold H of the threshold signal V in such manner that this threshold is reached by the pulse of the signal R occurring after the instant $t_1$ of carrier restoration when the level of the restored carrier is distinctly lower than −28 dB and is, for example, −33 dB. An overlap of the operating ranges of the two detection circuits then occurs in the range of the carrier levels from −28 dB to −33 dB.

In certain circumstances, however, the carrier detector of FIG. 1 as described so far may fail to operate properly in the case of short and untimely interruptions of the received carrier, for example owing to incidents on the transmission line. In particular, if the carrier interruption is short and if at the same time the level of the carrier is low, it may happen that on the one hand the first detection circuit has not detected the carrier interruption (the signal $A_1$ keeps the value "0") and on the other hand the second detection circuit, which has detected the interruption, does not detect restoration of the carrier (the signal $A_2$ keeps the value "1") as the pulse occurring after this instant of restoration has too low an amplitude. The detector then indicates quite wrongly that the carrier has been interrupted (the output signal A has the value "1") and remains blocked in this position.

Figure 6:
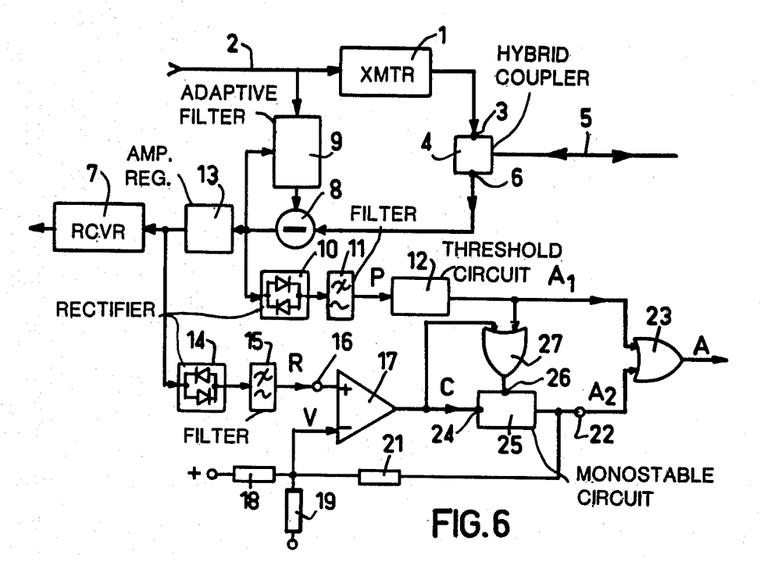
FIG. 6 shows a circuit diagram of a detector according to the invention which is an improvement of the detector shown in FIG. 1.

This drawback can be avoided by means of an improved version of the detector according to the invention shown in FIG. 6. The majority of the components in FIG. 1 and FIG. 6 are identical and have been referenced in the same manner. However, in FIG. 6 the output of the comparator 17 is connected to an excitation input 24 of a monostable circuit 25 whose output constitutes the output 22 of the bistable circuit having hysteresis and, consequently, of the second detection circuit. This monostable circuit 25 is arranged to produce, in response to a descending edge of the signal C at its input, a logic signal "1" during a period of time at least equal to the maximum period of time $\tau$ in which the signal at the output of the echo canceler decreases to zero after an interruption of the carrier. The monostable circuit 25 has also a resetting input 26 connected to the output of an OR-gate 27, the two inputs of which are connected to the output of the comparator 17 and to the output of the threshold circuit 12, respectively. In this manner, during the excitation period of the monostable circuit 25 (having a value of, for example, $\tau=5$ seconds) its output signal can be reset to the value "0" when one of the two signals C and A assumes the value "1".

Figure 7:
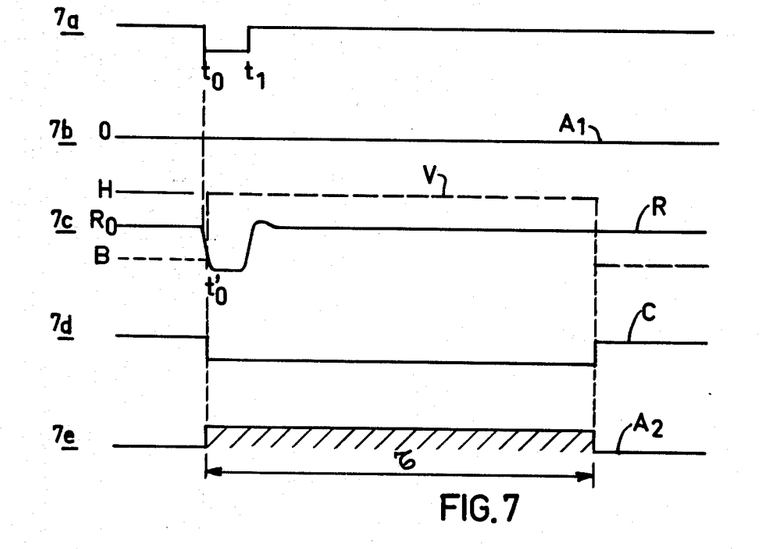
FIG. 7 shows a number of time diagrams illustrating the operation of the detector of FIG. 6.

The diagrams of FIG. 7 illustrate the operation of the detector shown in FIG. 6 for the above-described case in which the detector shown in FIG. 1 fails to operate properly. The diagram 7a shows a brief carrier interruption between the instants $t_o$ and $t_1$. The carrier interruption is not detected by the first detection circuit whose output signal $A_1$ keeps the value "0". The signal R applied to the bistable circuit of the second detection circuit shows a decrease of 20 dB after the instant $t_o$ of the carrier interruption but substantially no pulse after the instant $t_1$ of the carrier restoration. At the instant $t_o'$ at which the signal R exceeds the low threshold B, the signal C changes to the value "0", in response to which the monostable circuit 25 is excited and the output signal $A_2$ changes to the value "1"; the threshold signal V simultaneously assumes the value of the high threshold A. In contrast to the detector shown in FIG. 1, which would remain blocked in this state after the instant $t_1$ of the restoration of the carrier, the detector is released at the end of the excitation time $\tau$ of the monostable circuit 25, as then the signal $A_2$ changes back to the value "0", causing the low threshold B to be set and the logic signal C to assume the value "1".

Whether the detector shown in FIG. 6 operates properly can be easily checked for the normal circumstances which were assumed in the description of the detector shown in FIG. 1. The monostable circuit 25 which is always excited at the occurrence of a carrier interruption, can be reset to zero prior to the end of the normal excitation period $\tau$ by the signal C changing to the value "1", in response to which the restoration of the carrier is detected by the second detection circuit. The operation is then similar to the operation illustrated in FIG. 3. When the duration of the carrier interruption is greater than the normal excitation period $\tau$ of the monostable circuit 25, this circuit is also reset to zero before the end of this period $\tau$ by the signal $A_1$ changing to the value "1" when the first detection circuit detects the carrier interruption; the operation is then similar to the operation illustrated in FIG. 4.

What is claimed is:

1. A carrier detector in a modem provided with an echo canceler, the carrier detector comprising a first detection circuit which, in processing a signal representative of the level of the output signal of the echo canceler, produces a signal indicative of the interruption of the carrier signal, characterized in that the carrier detector further comprises a second detection circuit which processes a second signal representative of the level of the output signal of an amplitude regulator connected to the output of the echo canceler, this second detection circuit including a bistable circuit having hysteresis and having two thresholds located on both side of the operating value of said second level signal with predetermined deviations with respect to this operating value, this bistable circuit changing to a first state corresponding to the indication of a carrier interruption when the second level signal decreases to below the low threshold, and changing to a second state when the second level signal increases to above the high threshold or when the first detection circuit furnishes the indication of a carrier interruption, the indication of a carrier interruption at the output of the carrier detector being produced by the first or the second detection circuit.

2. A carrier detector as claimed in claim 1, characterized in that it comprises means for limiting the period of time in which the bistable circuit is in its first state, to a predetermined value.

* * * * *

UNITED STATES PATENT AND TRADEMARK OFFICE
CERTIFICATE OF CORRECTION

PATENT NO. : 4,355,406
DATED : October 19, 1982
INVENTOR(S) : LOIC B.Y. GUIDOUX

It is certified that error appears in the above—identified patent and that said Letters Patent is hereby corrected as shown below:

On the title page item [73] assignee:

"U.S. Philips Corporation, New York, NY" should be

--"Telecommunications Radioelectriques et Telephoniques

T.R.T., Paris, France"--

Signed and Sealed this

Twenty-second Day of February 1983

[SEAL]

Attest:

GERALD J. MOSSINGHOFF

*Attesting Officer*  *Commissioner of Patents and Trademarks*